United States Patent
Mammen et al.

(10) Patent No.: US 7,593,334 B1
(45) Date of Patent: Sep. 22, 2009

(54) METHOD OF POLICING NETWORK TRAFFIC

(75) Inventors: Neil Mammen, San Jose, CA (US); Sanjay Agarwal, San Jose, CA (US)

(73) Assignee: Altera Corporation, San Jose, CA (US)

( * ) Notice: Subject to any disclaimer, the term of this patent is extended or adjusted under 35 U.S.C. 154(b) by 969 days.

(21) Appl. No.: 10/151,775

(22) Filed: May 20, 2002

(51) Int. Cl.
G01R 31/08 (2006.01)
(52) U.S. Cl. .................................................. 370/235
(58) Field of Classification Search ......... 370/229–238, 370/395.21, 412, 503
See application file for complete search history.

(56) References Cited

U.S. PATENT DOCUMENTS

| | | | |
|---|---|---|---|
| 4,710,966 A | 12/1987 | Aufiero | |
| 4,893,302 A | 1/1990 | Hemmady et al. | |
| 5,195,089 A * | 3/1993 | Sindhu et al. | 370/235 |
| 5,257,395 A | 10/1993 | Li | |
| 5,274,644 A * | 12/1993 | Berger et al. | 370/230 |
| 5,367,523 A * | 11/1994 | Chang et al. | 370/235 |
| 5,398,315 A | 3/1995 | Johnson et al. | |
| 5,400,288 A | 3/1995 | Hashimoto et al. | |
| 5,541,852 A * | 7/1996 | Eyuboglu et al. | 709/232 |
| 5,598,408 A | 1/1997 | Nickolls et al. | |
| 5,696,719 A | 12/1997 | Baek et al. | |
| 5,715,437 A | 2/1998 | Baker et al. | |
| 5,796,719 A * | 8/1998 | Peris et al. | 370/231 |
| 5,805,816 A | 9/1998 | Picazo et al. | |
| 5,831,971 A | 11/1998 | Bonomi et al. | |
| 5,898,689 A * | 4/1999 | Kumar et al. | 370/232 |
| 6,018,612 A | 1/2000 | Thomason et al. | |
| 6,047,304 A | 4/2000 | Ladwig et al. | |
| 6,134,217 A * | 10/2000 | Stiliadis et al. | 370/232 |
| 6,163,539 A | 12/2000 | Alexander et al. | |
| 6,208,643 B1 * | 3/2001 | Dieterich et al. | 370/389 |
| 6,226,338 B1 | 5/2001 | Earnest et al. | |
| 6,247,061 B1 * | 6/2001 | Douceur et al. | 709/240 |
| 6,275,507 B1 | 8/2001 | Anderson et al. | |
| 6,377,071 B1 | 4/2002 | Wang et al. | |
| 6,377,546 B1 | 4/2002 | Guerin et al. | |
| 6,377,587 B1 | 4/2002 | Grivan | |
| 6,381,214 B1 * | 4/2002 | Prasad | 370/230.1 |
| 6,389,468 B1 | 5/2002 | Muller et al. | |
| 6,438,145 B1 | 8/2002 | Movshovich et al. | |

(Continued)

FOREIGN PATENT DOCUMENTS

WO  WO 99/13397  3/1999

OTHER PUBLICATIONS

U.S. Appl. No. 10/144,387, filed May 10, 2002, Maturi et al.

(Continued)

*Primary Examiner*—Kevin C Harper
*Assistant Examiner*—Xavier Wong
(74) *Attorney, Agent, or Firm*—Martine Penilla & Gencarella, LLP

(57) ABSTRACT

According to one embodiment, a method of regulating traffic at a network hardware machine is disclosed. The method includes receiving a data packet, calculating a time stamp difference value, determining whether a maximum token bucket value has been exceeded by the time stamp difference value and determining whether there are enough tokens to transmit the packet.

13 Claims, 3 Drawing Sheets

U.S. PATENT DOCUMENTS

| | | | |
|---|---|---|---|
| 6,477,168 B1 * | 11/2002 | Delp et al. | 370/395.4 |
| 6,487,202 B1 | 11/2002 | Klausmeier et al. | |
| 6,721,271 B1 | 4/2004 | Beshai et al. | |
| 6,738,880 B2 | 5/2004 | Lai et al. | |
| 6,757,897 B1 | 6/2004 | Shi et al. | |
| 6,782,470 B1 | 8/2004 | Berg et al. | |
| 6,804,815 B1 | 10/2004 | Kerr et al. | |
| 6,823,409 B2 | 11/2004 | Jones et al. | |
| 6,910,092 B2 * | 6/2005 | Calvignac et al. | 710/310 |
| 6,915,480 B2 | 7/2005 | Calle et al. | |
| 6,934,256 B1 * | 8/2005 | Jacobson et al. | 370/235 |
| 6,950,395 B1 * | 9/2005 | Bashandy et al. | 370/230.1 |
| 6,973,036 B2 * | 12/2005 | Goetzinger et al. | 370/235 |
| 6,985,964 B1 | 1/2006 | Petersen et al. | |
| 7,002,965 B1 | 2/2006 | Cheriton | |
| 7,085,229 B1 * | 8/2006 | Potter et al. | 370/231 |
| 7,110,400 B2 | 9/2006 | Hronik | |
| 7,206,857 B1 | 4/2007 | Mammen et al. | |
| 7,292,578 B1 * | 11/2007 | Kerr et al. | 370/395.32 |
| 7,315,901 B1 * | 1/2008 | Bass et al. | 709/240 |
| 2001/0030961 A1 | 10/2001 | Gazsi et al. | |
| 2001/0049744 A1 | 12/2001 | Hussey et al. | |
| 2002/0036984 A1 * | 3/2002 | Chiussi et al. | 370/232 |
| 2002/0044559 A1 | 4/2002 | Ardalan et al. | |
| 2002/0048270 A1 | 4/2002 | Allen, Jr. et al. | |
| 2002/0050959 A1 | 5/2002 | Buckelew et al. | |
| 2002/0056025 A1 | 5/2002 | Qiu et al. | |
| 2002/0071321 A1 | 6/2002 | Barrie et al. | |
| 2002/0099900 A1 | 7/2002 | Kawarai et al. | |
| 2002/0101867 A1 | 8/2002 | O'Callaghan et al. | |
| 2002/0122424 A1 | 9/2002 | Kawarai et al. | |
| 2002/0126672 A1 | 9/2002 | Chow et al. | |
| 2002/0126710 A1 | 9/2002 | Bergenwall et al. | |
| 2002/0145974 A1 | 10/2002 | Saidi et al. | |
| 2002/0163935 A1 | 11/2002 | Paatela et al. | |
| 2002/0169921 A1 | 11/2002 | Saitoh | |
| 2003/0012209 A1 | 1/2003 | Abdelilah et al. | |
| 2003/0053460 A1 | 3/2003 | Suda et al. | |
| 2003/0063348 A1 | 4/2003 | Posey et al. | |
| 2003/0067930 A1 | 4/2003 | Salapura et al. | |
| 2003/0088671 A1 | 5/2003 | Klinker et al. | |
| 2003/0099194 A1 | 5/2003 | Lee et al. | |
| 2003/0099199 A1 * | 5/2003 | Kiremidjian et al. | 370/230.1 |
| 2003/0103507 A1 | 6/2003 | Lynch et al. | |
| 2003/0112802 A1 | 6/2003 | Ono et al. | |
| 2003/0156588 A1 * | 8/2003 | Elbourne et al. | 370/395.41 |
| 2003/0165116 A1 * | 9/2003 | Fallon et al. | 370/230.1 |
| 2003/0189932 A1 | 10/2003 | Ishikawa et al. | |
| 2003/0193936 A1 | 10/2003 | Wolkrich et al. | |
| 2003/0214948 A1 | 11/2003 | Jin et al. | |
| 2004/0062261 A1 * | 4/2004 | Zecharia et al. | 370/419 |
| 2004/0066804 A1 | 4/2004 | Holma | |
| 2005/0025140 A1 | 2/2005 | Deforche et al. | |
| 2005/0132132 A1 | 6/2005 | Rosenbluth et al. | |
| 2005/0141503 A1 | 6/2005 | Welfeld | |
| 2005/0144553 A1 | 6/2005 | Bass et al. | |
| 2005/0190797 A1 * | 9/2005 | Elliot | 370/503 |

OTHER PUBLICATIONS

U.S. Appl. No. 10/144,091, filed May 10, 2002, Maturi et al.
U.S. Appl. No. 10/153,137, filed May 20, 2002, Mammen et al.
U.S. Appl. No. 10/144,092, filed May 10, 2002, Maturi et al.
U.S. Appl. No. 10/151,774, filed May 20, 2002, Mammen et al.

* cited by examiner

METHOD OF POLICING NETWORK TRAFFIC

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to networking systems; more particularly, the present invention relates to policing network traffic at a router.

BACKGROUND

A router is usually designed to perform one or more basic networking tasks. One basic networking task is to police network traffic through the router. Policing ensures that admitted traffic that flows through the router adheres to an original contract of service between the network and the application.

Routers typically implement a leaky bucket controller that enforces compliance with flow descriptors. The leaky bucket controller generates token credits at a particular rate, which are deposited in a token bucket that holds a maximum number of tokens. When a packet in an incoming stream arrives at the router, the leaky bucket controller examines the length of the packet.

Typically one token is equivalent to one byte. Thus, in order for the transaction to comply, there must be enough tokens in the token bucket to process the entire length of the packet. The controller calculates whether the tokens in the token bucket are greater than the packet length. If so, a new token bucket is equal to the token bucket minus the packet length. Otherwise the packet is dropped. In order to calculate the above information, the controller calculates a token bucket for every clock tick, wherein the token bucket equals the token bucket plus the token rate. The token bucket typically cannot exceed a maximum size.

The problem with typical routers is that in new applications, a router can receive many million data flows per minute. Accordingly, the router needs to have sufficient circuit components (e.g., adders, multipliers, memory, etc.) to accommodate such flow. For instance, a vast amount of memory is required. Accordingly, several large memory devices are necessary to save all of the values used for the calculations.

SUMMARY

According to one embodiment, a method of regulating traffic at a network hardware machine is disclosed. The method includes receiving a data packet, calculating a time stamp difference value, determining whether a maximum token bucket value has been exceeded by the time stamp difference value and determining whether there are enough tokens to transmit the packet.

According to a further embodiment, the method includes subtracting the current packet length if the maximum token bucket value has not been exceeded by the time stamp difference value, and converting the current packet length into a time value. The packet length is converted into a time value by multiplying the packet length with an inverted token rate value.

According to yet a further embodiment, the method includes calculating a last time stamp value if there are enough tokens to transmit the packet, calculating a value for the remaining number of tokens and storing the value for the remaining number of tokens.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method of traffic policing network data in a networking hardware machine is described herein. According to one embodiment, a time stamp difference value is calculated upon a packet being received at the networking hardware machine. The time stamp difference indicates how long tokens have been accumulating at the networking hardware machine.

Next, it is determined whether a maximum token bucket value has been exceeded by the time stamp difference value. If the maximum token bucket value has been exceeded by the time stamp difference value, the time stamp difference is replaced by the maximum token bucket value. If not, the time stamp difference remains unchanged.

Subsequently, the packet length is converted into a time value. It is then determined whether there are enough tokens to transmit the packet. If there are not enough tokens, the packet is dropped. If there are a sufficient number of tokens, a new last time stamp value and the remaining number of tokens is calculated and saved.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
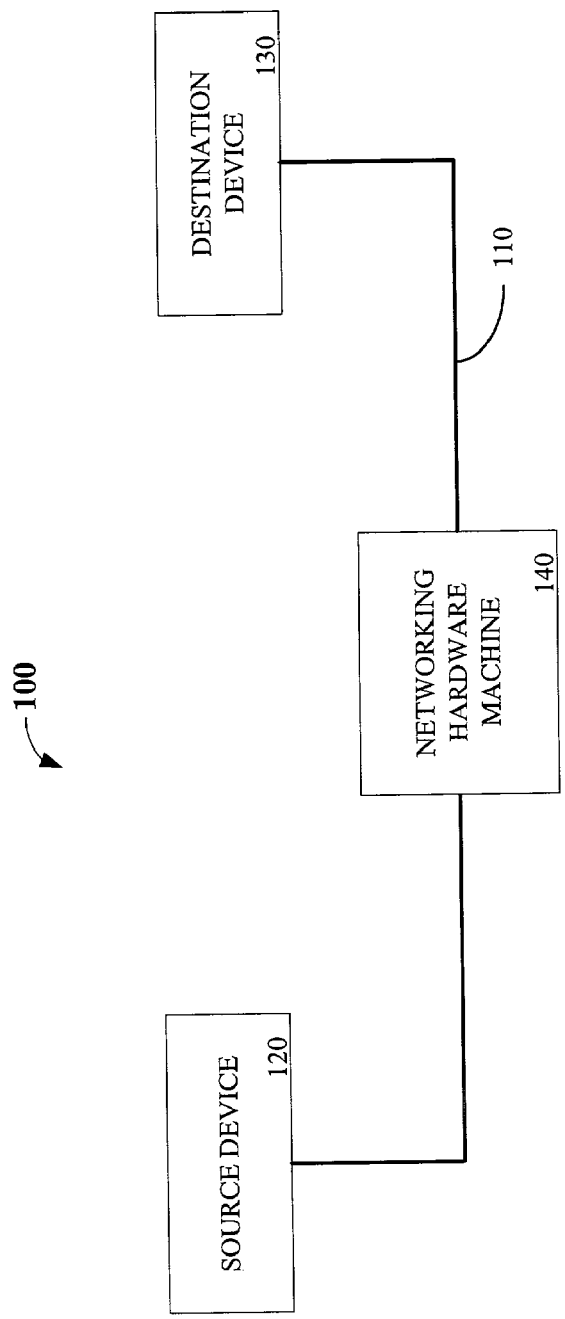
FIG. 1 illustrates one embodiment of a network.

FIG. 1 illustrates one embodiment of a network 100. Network 100 includes at least one communication link 110, at least one source device 120, at least one destination device 130, and at least one networking hardware machine 140. Communication link 110 may comprise any form of physical media layer, such as Ethernet, FDDI, or HDLC serial link.

Networking hardware machine 140 receives data packets from source device 120 and forwards the packets to destination device 130. In one embodiment, networking hardware machine 140 performs one or more basic networking tasks. For example, networking hardware machine 140 includes processing, classification, forwarding engine, policing and other types of components.

According to one embodiment, networking hardware machine 140 is a router. However, in other embodiments, networking hardware machine 140 may be a switch, or other device, that determines the next destination device 130 to which a data packet should be forwarded. When data traffic is to be carried in network 100, an initiating source device 120 requests that a bi-directional path (e.g., a connection comprising nodes and links) be established in the network between the source device 120 and a specified destination device 130.

In one embodiment, admission control policies govern whether network 100 can accommodate a request to establish a new connection. The admission decision is typically based on flow descriptors (e.g., average bandwidth and burstiness) characterizing the traffic to be carried on the connection once it is established, and any quality-of-service requirements for the traffic. The admission decision will also be based on what resources are available in network 100 (e.g., the amount of unused bandwidth in links and unused buffer space in nodes) to accommodate the request. A request for a connection will specify or provide the flow descriptors.

In response network 100 will (based on the specified flow descriptors) determine the amount of network 100 resources that will need to be assigned to the request. Based on the determination, the network will decide whether to admit the request. If the request is admitted, a "contract" is made by which network 100 agrees to carry the traffic and to meet any quality-of-service guarantees so long as the traffic stays within the specified flow descriptors.

The performance of network 100 depends on admitted connections complying with their contracts. For example, congestion may be caused by a source device 120 supplying information to network 100 so as to exceed contract specifications, thereby causing statistical fluctuations in the traffic flow through network 100. Such fluctuations can degrade network 100 performance and affect quality-of-service levels for other connections in network 100. Accordingly, network 100, with the aid of networking hardware machines 140, monitors, or controls traffic on, connections to ensure that the connections comply with their contracts.

Figure 2:
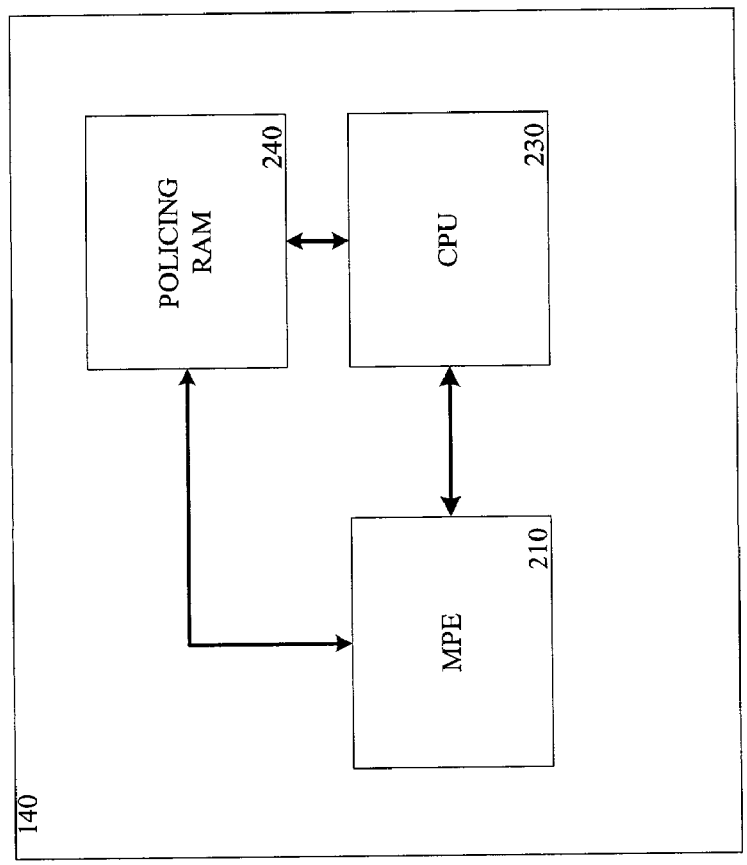
FIG. 2 illustrates one embodiment of a networking hardware machine.

FIG. 2 illustrates one embodiment of a networking hardware machine 140. Networking hardware machine 140 includes a multiple propulsion engine (MPE) 210, a central processing unit (CPU) 230 and a policing module 240. In one embodiment, the components of networking hardware machine 140 are all included within a single application specific integrated circuit (ASIC). However, one of ordinary skill in the art will appreciate that the components of networking hardware machine 140 may be implemented on two or more separate integrated circuits CPU 230 is a general-purpose programmed computer whose function is to manage the overall operation of networking hardware machine 140 in cooperation with other components of network 100 of which the respective networking hardware machine 140 is a part. In addition, CPU 230 may also handle all other tasks such as participating in routing protocols, resource reservation, handling packets that need extra attention, and other administrative duties.

MPE 210 is a network processing element that processes packets by classifying, editing, policing and finally scheduling the packets out for delivery. According to one embodiment, MPE 210 operates according to a 10 Gb mode and a 40 Gb mode by using wider width data paths and faster processing speeds.

MPE 210 uses Policing SRAM module 240 for storing data and timestamp values for each of the flows that it controls. MPE 210 ensures that admitted traffic that flows through networking hardware machine 140 adhere to the original contract of service between the network and the application. In particular, MPE 210 monitors and regulates accepted connections. If the arrival of a packet into network 100 causes a connection to violate its contract, MPE 210 drops the packet. MPE 210 thus prevents heavily loaded connections from compromising the performance of other connections.

According to one embodiment, MPE 210 includes a leaky bucket controller (not shown) that enforces data received at networking hardware machine 240 to comply with flow descriptors. The leaky bucket controller generates token credits at a particular rate (Token Rate (TR)), which are deposited in a token bucket (TB) that holds a particular number of tokens ($TB_{MAX}$).

When a packet in an incoming stream arrives at the leaky bucket controller, the packet claims a number of tokens equal to the number of bytes in the packet from the leaky bucket before being carried through network 100. If sufficient tokens are not immediately available, the packet is discarded or marked with a low priority. If sufficient tokens are immediately available, the packet is carried through network 100 via networking hardware machine 140.

Given the status of the token bucket (e.g., the value of TR, $TB_{MAX}$ and the number of tokens in the TB) for each connection, the MPE 210 can determine the conformance time of an arriving packet (e.g., the time at which the arriving packet first conforms to the connection flow descriptors and at which time a token will be available in the buffer for the arriving packet). A connection is said to be compliant if all of its packets are conforming.

In one embodiment, Policing SRAM module 240 is implemented using one or more static random access memory (SRAM) devices. According to a further embodiment, policer 240 employs a calculation methodology that reduces the amount of data that has to be internally stored. Therefore, the size of the SRAM devices used as policing module 240 may be reduced. One of ordinary skill in the art will appreciate that other types of memory devices may be used to implement policing module 240.

The variables used by policing module 240 include TR, TB, $TB_{MAX}$, a current time stamp (CTS), a last time stamp (LTS), packet length (PL) and an Inverted Token Rate (InvTR). TB indicates how many tokens a flow currently has. In one embodiment, TB comprises 46 bits, 28 mantissa and 18 fractional. $TB_{MAX}$ indicates the maximum burst tokens allowed. CTS is a 41 bit value, while LTS is a 46 bit value (41 bits of integer and 5 bits of fraction). PL is measured in bytes, wherein 40 is the minimum and 9700 is the maximum.

TR indicates the number of tokens to add per clock tick. For instance, if networking hardware machine 140 is receiving data packets at the maximum operating rate, ($TR_{MAX}$) is 18.80 tokens per tick (40 Gb/s*⅛ Bytes*1/266 MHz, where 40 Gb/s=$TR_{MAX}$, and 266 MHz is the operating frequency of networking hardware machine 140). Note that TR is calculated with Byte resolution (e.g., 1 token=1 byte) so there is no cumulative error.

Similarly, if networking hardware machine 140 is receiving data packets at the minimum operating rate, ($TR_{MIN}$) is 7.52 E-06 tokens per tick (16 Kb/s*⅛ Bytes*1/266 MHz, where 16 Kb/s=$TR_{MIN}$). InvTR is 1/TR. Thus, $InvTR_{MIN}$=0.0532 ticks/token and $InvTR_{MAX}$=132,978.72 ticks per token. In one embodiment, the InvTR value is stored in the flow descriptor as a 36 bit value, 18 integer bits and 18 fraction bits. In other embodiments, InvTR may be stored in a 2K×36 SRAM comprised within policing module 240.

Figure 3:
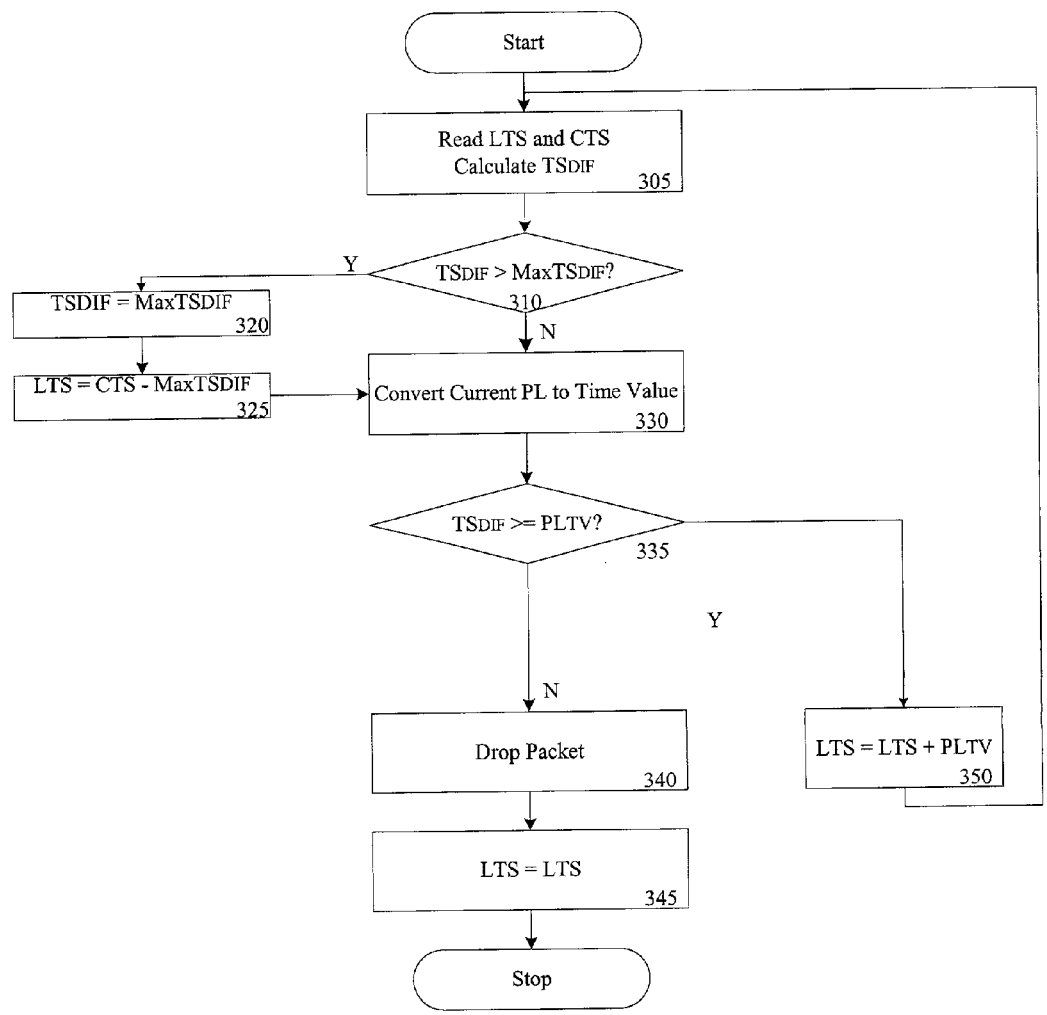
FIG. 3 is a flow diagram of one embodiment for the operation of a policer.

FIG. 3 is a flow diagram of one embodiment for the operation of policing SRAM module 240. At processing block 305, a Time Stamp Difference ($TS_{DIF}$) is calculated. $TS_{DIF}$ indicates how long tokens have been accumulating (e.g., CTS-LTS). In one embodiment, a maximum $TS_{DIF}$ ($MaxTS_{DIF}$) is from 0.00 seconds to 5 seconds, and counted in increments of 0.001 seconds to save bits. $MaxTS_{DIF}$ is a 9 bit value, and is stored in the flow descriptor. Thus, the total number of flow descriptor bits needed is 21 bits for policer 240. Typically, $MaxTS_{DIF}$ is expected to be 130 ms or less. However, TB is allowed up to 5 seconds.

At processing block 310, it is determined whether $TB_{MAX}$ has been exceeded by $TS_{DIF}$ (e.g., $TS_{DIF}>TB_{MAX}$). If $TS_{DIF}>TB_{MAX}$, then $TS_{DIF}=TB_{MAX}$, processing block 320. At processing block 325, LTS is assigned the value of CTS-$TB_{MAX}$ (e.g., LTS=CTS-$TB_{MAX}$). However, if $TS_{DIF}<TB_{MAX}$, then $TS_{DIF}$ is left unchanged At processing block 330, the PL is converted into a time value (e.g., clock ticks). This is done by multiplying the PL*InvTR. In one embodiment, PL is 14 bits (all integer) and InvTR is 18 bits of integer and 5 bits of fraction. Therefore, the maximum size of PL measured in clock ticks is 32 bits of Integer and 18 bits of fraction. The large fractions ensure there is a lower round off error rate.

The maximum packet size of PL ($PL_{MAX}$) is 9600 Bytes. Thus, $PL_{MAX}$ at 40 Gb/s is 532 ticks (10,000*0.0532). $PL_{MAX}$ at 16 Kb/s is 1,329,787,200 ticks (10,000*132,978.72), which is approximately 5 seconds, indicating that a 9600 byte packet would not be allowed at the 16 Kb/s mode, unless special provisions are made. The minimum packet size of PL ($PL_{MIN}$) is 48 Bytes. Thus, $PL_{MIN}$ at 40 Gb/s is 2.5536 ticks (48*0.0532). $PL_{MIN}$ at 16 Kb/s is 6,382,978.56 ticks (48*132,978.72).

At decision block 335, it is determined whether there are enough tokens to transmit the packet (e.g., $TS_{DIF}>=PL*InvTR$). If there are not enough tokens, the packet is dropped, processing block 340. At processing block 345, LTS is saved back without any additional changes.

If there are a sufficient number of tokens, the new LTS and the remaining of tokens (REMTOK) is calculated and saved, processing block 350. LTS=LTS+PL*InvTR, and REMTOK=$TS_{DIF}$*TR−PL. LTS is 41 bits of integer and 6 bits of fraction. Therefore, NLTS is saved as 41 bits of integer and 6 bits of fraction, for a total of 47 bits.

The above-described method reduces the number of calculations that are necessary to store during a policing operation at networking hardware machine 140. Reducing the amount of stored calculations, reduces the mount of memory space that is necessary for policing 240. Consequently, the policing method described above reduces the manufacturing costs and size constraints of a networking hardware machine.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method of regulating traffic at a network hardware machine, comprising:
   receiving a data packet;
   calculating a time stamp difference value that indicates a current transmission capacity;
   making the time stamp difference value equal to a maximum time difference when the time stamp difference value is greater than the maximum time difference;
   assigning a current time stamp value a current time value;
   setting a last time stamp value to a difference between the current time stamp value and the maximum time difference when the time stamp difference value is greater than the maximum time difference;
   converting the current packet length into a time value by multiplying the packet length with an inverted token rate value, the token rate describing how fast transmission capacity is added to communications associated with the received packet; and
   determining whether to transmit the packet based on whether the time stamp difference value is greater than the time value converted from the current packet length.

2. The method of claim 1 wherein determining whether to transmit the packet further includes:
   transmitting the packet if the time stamp difference value is greater than or equal to the time value; and
   dropping the packet if the time stamp difference value is less than the time value.

3. The method of claim 2 wherein the converted packet length is measured in clock ticks.

4. The method of claim 2 further comprising
   adding to the last time stamp value the time value converted from the current packet length when the packet is transmitted.

5. The method of claim 2 further comprising:
   leaving the last time stamp value unchanged when the packet is dropped.

6. The method of claim 1 wherein the time stamp difference value is calculated by subtracting a last time stamp value from a current time stamp value.

7. The method of claim 1, wherein the token rate indicates how many bytes of transmission capacity to add per clock tick.

8. A networking hardware machine, comprising:
   a logic device; and
   a policing random access memory (RAM) module coupled to the logic device, that regulates packet data traffic to comply with flow descriptors by calculating a time stamp difference value that indicates a current transmission capacity, determining whether a maximum time difference has been exceeded by the time difference value, making the time stamp difference value equal to the maximum time stamp difference when the maximum time difference has been exceeded, converting a current packet length of a packet into a time value by multiplying the packet length with an inverted token rate, the token rate describing how fast transmission capacity is added to communications associated with the received packet, and determining whether to transmit the packet based on whether the time stamp difference is greater than a time value converted from a length of the packet,
   wherein the policing RAM module assigns a current time stamp value a current time value, and sets a last time stamp value to a difference between the current time stamp value and the maximum time difference when the time stamp difference value is greater than the maximum time difference.

9. The networking hardware machine of claim 8 wherein the policing RAM module calculates a last time stamp value if there are enough tokens to transmit the packet, calculates a value for the remaining number of tokens, and stores the value for the remaining number of tokens.

10. The networking hardware machine of claim 8 further comprising a multiple propulsion engine (MPE) coupled to the policing RAM module and the logic device.

11. The networking hardware machine of claim 8 wherein the logic device is a central processing unit (CPU).

12. A network, comprising:
   a source device;
   a networking hardware machine, coupled to the source device, that regulates packet data traffic to comply with flow descriptors by calculating a time stamp difference value that indicates a current transmission capacity, assigning a current time stamp value a current time value, setting a last time stamp value to a difference between the current time stamp value and a maximum time difference when the time stamp difference value is greater than the maximum time difference, converting a current packet length into a time value by multiplying the packet length with an inverted token rate value, the token rate describing how fast transmission capacity is added to communications associated with the received packet, determining whether the maximum time difference has been exceeded by the time stamp difference value, making the time stamp difference value equal to the maximum time difference when the maximum time difference has been exceeded, and determining whether to transmit a packet based on whether the time stamp difference is greater than a time value converted from a length of the packet; and
   a destination device coupled to the networking hardware machine.

13. The network of claim 12 wherein networking hardware machine, comprises:
   a central processing unit (CPU);
   a policing static random access memory (SRAM) module coupled to the CPU; and
   multiple propulsion engine (MPE) coupled to the policing SRAM module and the CPU.

* * * * *

UNITED STATES PATENT AND TRADEMARK OFFICE
CERTIFICATE OF CORRECTION

PATENT NO. : 7,593,334 B1  Page 1 of 1
APPLICATION NO. : 10/151775
DATED : September 22, 2009
INVENTOR(S) : Mammen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1638 days.

Signed and Sealed this

Twenty-first Day of September, 2010

David J. Kappos
*Director of the United States Patent and Trademark Office*